US008321121B2

(12) United States Patent
Santou et al.

(10) Patent No.: US 8,321,121 B2
(45) Date of Patent: Nov. 27, 2012

(54) ENGINE FUEL INJECTION CONTROL APPARATUS

(75) Inventors: Norihiro Santou, Machida (JP); Taiki Tsukada, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 539 days.

(21) Appl. No.: 12/179,194

(22) Filed: Jul. 24, 2008

(65) Prior Publication Data

US 2009/0037081 A1 Feb. 5, 2009

(30) Foreign Application Priority Data

Aug. 4, 2007 (JP) ................................ 2007-203703
May 9, 2008 (JP) ................................ 2008-122848

(51) Int. Cl.
*G06F 17/00* (2006.01)
*F02M 51/00* (2006.01)

(52) U.S. Cl. ........... 701/104; 701/54; 123/493; 477/111

(58) Field of Classification Search .................... 701/51, 701/53, 54, 104; 123/493; 477/111
See application file for complete search history.

(56) References Cited

U.S. PATENT DOCUMENTS

| | | | | |
|---|---|---|---|---|
| 4,535,744 | A * | 8/1985 | Matsumura | 123/493 |
| 5,470,289 | A * | 11/1995 | Pioch et al. | 477/111 |
| 5,514,047 | A * | 5/1996 | Tibbles et al. | 477/46 |
| 5,658,217 | A * | 8/1997 | Tsukada | 477/109 |
| 6,063,003 | A * | 5/2000 | Kubota et al. | 477/43 |
| 6,266,597 | B1 * | 7/2001 | Russell et al. | 701/54 |
| 6,377,882 | B1 * | 4/2002 | Ito | 701/51 |
| 6,506,140 | B1 * | 1/2003 | O'Neil et al. | 477/62 |
| 6,574,535 | B1 * | 6/2003 | Morris et al. | 701/22 |
| 7,220,212 | B2 * | 5/2007 | Endo | 477/3 |
| 7,315,774 | B2 * | 1/2008 | Morris | 701/53 |
| 7,577,507 | B2 * | 8/2009 | Morris | 701/51 |
| 2007/0213909 | A1 * | 9/2007 | Doering et al. | 701/54 |

FOREIGN PATENT DOCUMENTS

| | | |
|---|---|---|
| JP | H10-252514 A | 9/1998 |
| JP | 2006-275060 | 10/2006 |
| JP | 2006-316761 | 11/2006 |
| JP | 2007-100662 | 4/2007 |
| JP | 2007-154707 | 6/2007 |

OTHER PUBLICATIONS

The Japanese Office Action of corresponding Japanese Application No. 2008-122848, dated Mar. 23, 2012 and mailed Mar. 27, 2012.

* cited by examiner

*Primary Examiner* — Mahmoud Gimie
*Assistant Examiner* — David Hamaoui
(74) *Attorney, Agent, or Firm* — Global IP Counselors, LLP

(57) ABSTRACT

A fuel injection control apparatus is provided with a supply control section, a stop control section, a timing estimating section and a torque recovery control section. The supply control section controls fuel supplied to an engine based on a detected prescribed vehicle running state. The stop control section stops supplying fuel upon detecting a first prescribed vehicle running state. The timing estimating section estimates a timing at which a drive train transmitting a drive force from the engine to a wheel will change from a non-drive state in which the engine rotates due to a force from the wheel to a drive state in which the wheel rotates due to a drive force of the engine. The torque recovery control section resumes supplying fuel upon detecting a second prescribed vehicle running state and stops resumption of fuel being supplied for a prescribed amount of time based on the timing.

8 Claims, 5 Drawing Sheets

ENGINE FUEL INJECTION CONTROL APPARATUS

CROSS-REFERENCE TO RELATED APPLICATIONS

This application claims priority to Japanese Patent Application No. 2007-203703, filed on Aug. 4, 2007, and Japanese Patent Application No. 2008-122848, filed on May 9, 2008. The entire disclosures of Japanese Patent Application Nos. 2007-203703 and 2008-122848 are hereby incorporated herein by reference.

BACKGROUND OF THE INVENTION

1. Field of the Invention

The present invention generally relates to a fuel injection control apparatus for an engine. More specifically, the present invention relates to a fuel injection control apparatus configured to suppress longitudinal vibration of a vehicle occurring due to a resumption of a fuel supply from a state in which the fuel supply has been stopped.

2. Background Information

In a vehicle equipped with an automatic transmission that engages a lockup clutch when an accelerator of the vehicle is in a released state (off) and the vehicle is moving due to momentum, i.e., coasting, a longitudinal vibration generally occurs in the vehicle when the accelerator pedal is depressed (turned on) while the vehicle is in a coasting state with the lockup clutch engaged. In order to suppress the longitudinal vibration, the fuel supply is stopped with respect to a cylinder that is expected to undergo combustion immediately before the torsional vibration of the drive train reaches a first peak. In this conventional technology, the resumption of the fuel supply is used as a trigger for stopping fuel to the cylinder that is expected to undergo combustion immediately before the torsional vibration of the drive train reaches a first peak. An example of this type of fuel injection control is disclosed in Japanese Laid-Open Patent Publication No. 10-252514.

In view of the above, it will be apparent to those skilled in the art from this disclosure that there exists a need for an improved fuel injection control apparatus. This invention addresses this need in the art as well as other needs, which will become apparent to those skilled in the art from this disclosure.

SUMMARY OF THE INVENTION

It has been discovered that with the technology described above, the timing at which the fuel supply is stopped is based on an OFF state of an idle switch and does not take into consideration the non-linear torque change that occurs due to gear backlash when a drive train transmits a drive force of the engine to a wheel changes from a non-drive state in which the engine rotates due to a force from the wheel to a drive state in which the wheel rotates due to a drive force of the engine. Consequently, when the fuel supply is stopped, backlash occurs and the vehicle undergoes longitudinal vibration.

The present invention was conceived in view of the problem described above. One object is to provide an engine fuel injection control apparatus that can improve the precision with which a timing at which a fuel supply to an engine of a vehicle is stopped after the fuel supply has been resumed is determined, thereby enabling a longitudinal vibration of the vehicle to be suppressed.

In order to achieve the above stated object, an engine fuel injection control apparatus is provided that basically comprises a supply control section, a stop control section, a timing estimating section and a torque recovery control section. The supply control section is configured to control a supply amount of a fuel supplied to an engine based on a detected prescribed vehicle running state. The stop control section is configured to stop supplying the fuel upon detecting that a first prescribed vehicle running state exists. The timing estimating section is configured to estimate a timing at which a drive train transmitting a drive force from the engine to a wheel will change from a non-drive state in which the engine rotates due to a force from the wheel to a drive state in which the wheel rotates due to a drive force of the engine. The torque recovery control section is configured to resume supplying the fuel upon detecting that a second prescribed vehicle running state exists and to stop resumption of fuel being supplied for a prescribed amount of time based on the timing estimated by the timing estimating section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
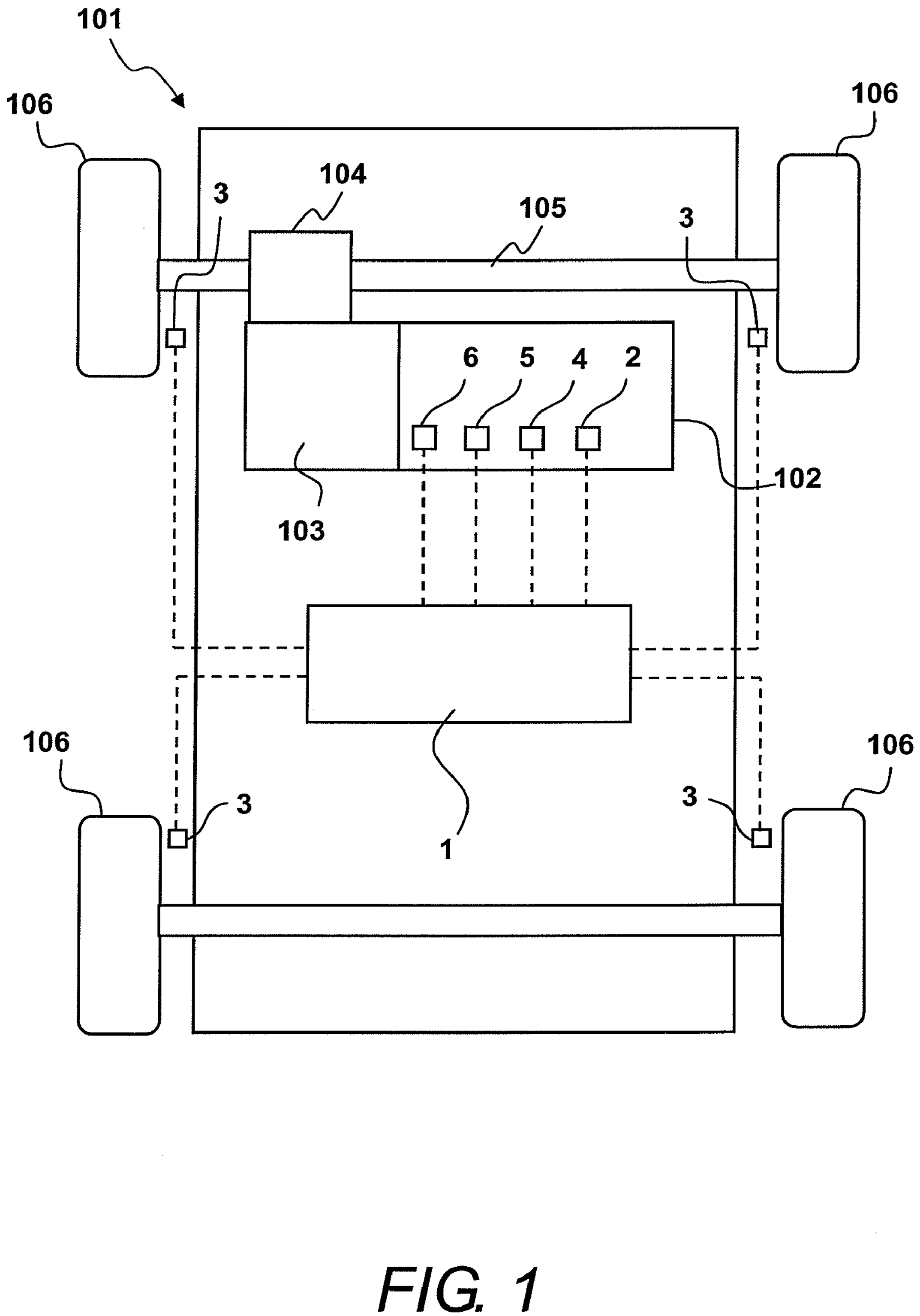
FIG. 1 is a schematic view of a vehicle equipped with an engine fuel supply control apparatus in accordance with one embodiment.

Referring initially to FIG. 1, a vehicle 101 is schematically illustrated that is equipped with an engine fuel injection control apparatus 1 in accordance with a first embodiment. Basically, the vehicle 101 is equipped with an engine 102 serving as a drive source, a transmission 103, a differential gear 104, a drive shaft 105 and four wheels 106. The transmission 103, the differential gear 104, and the drive shaft 105 constitute a drive train configured to transmit a drive force of the engine 102 to the wheels 106. The engine 102 has a plurality of cylinders 102*a*, 102*b*, 102*c*, . . . .

Figure 2:
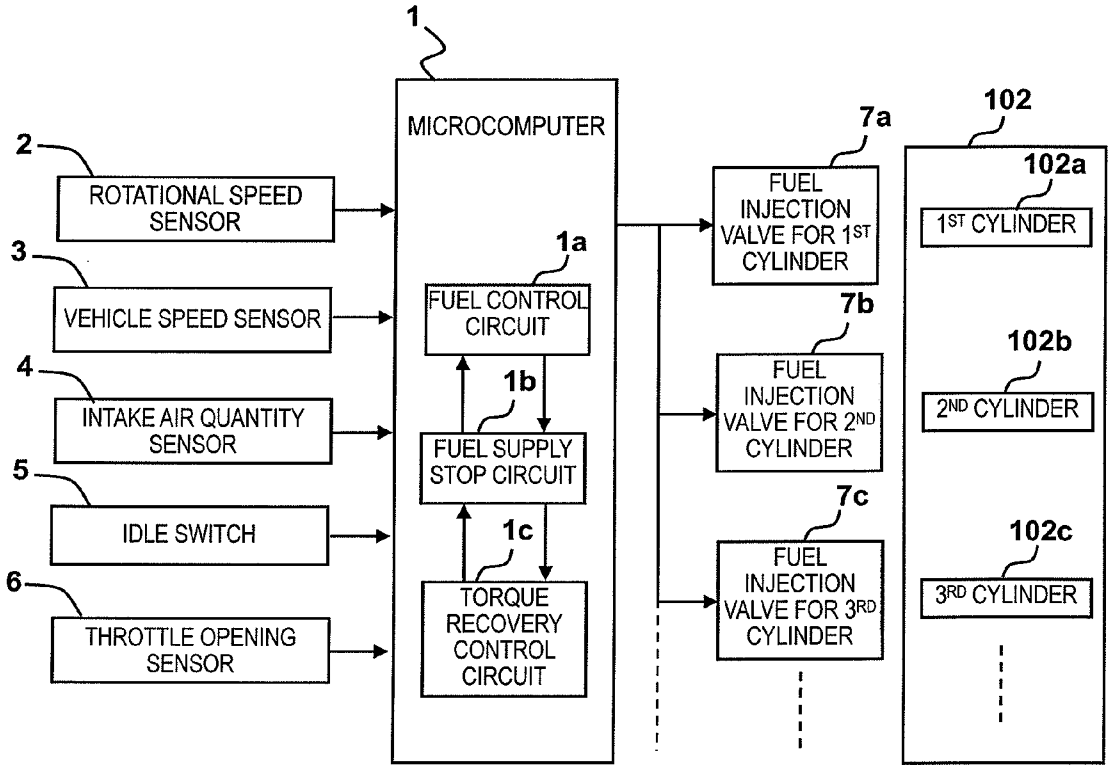
FIG. 2 is a schematic view of an engine fuel supply control apparatus in accordance with the illustrated embodiment.

The fuel injection control apparatus 1 basically includes a microcomputer with a fuel injection control program that controls the fuel injection as discussed below. As shown in FIG. 2, the fuel injection control apparatus 1 includes a fuel control circuit 1*a* (e.g., supply control section), a fuel supply stop circuit 1*b* (e.g., stop control section), and a torque recovery control circuit 1*c* (e.g., torque recovery control section). The fuel injection control apparatus 1 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the fuel injection control program can be any combination of hardware and software that will carry out the functions of the present invention.

The microcomputer of the fuel injection control apparatus 1 receives signals indicating detected operating conditions of the vehicle 101. In particular, the vehicle 101 includes an engine rotational speed sensor 2, a plurality of vehicle speed sensors 3, an intake air quantity sensor 4, an idle switch 5 and a throttle opening degree sensor 6. The signals from the sensors 2 to 6 are fed to the microcomputer of the fuel injection control apparatus 1. The fuel injection control apparatus 1 controls a fuel injection quantity of the engine 102 based on the signals from the aforementioned sensors.

Based on the engine rotational speed Ne and the intake air quantity Qa, the fuel control circuit 1*a* computes a fuel injection quantity to be delivered from fuel injection valves 7*a*, 7*b*, 7*c*, . . . provided in the intake ports of the cylinders 102*a*, 102*b*, 102*c*, . . . and outputs a fuel injection signal at a prescribed timing. The fuel injection valves 7 open and close in response to the injection signal from the fuel control circuit 1*a* so as to inject fuel in synchronization with the engine rotation.

Basically, the engine fuel injection control apparatus according to the illustrated embodiment determines a time at which to stop a resumed fuel supply based on a timing at which the drive train will change from a non-drive state in which it is rotated by a torque of the wheel 106 to a drive state in which it rotates due to a drive force from the engine 102. In other words, the apparatus determines a time at which to stop a resumed fuel supply based on a point in time corresponding to an end of a non-linear torque change occurring due to gear backlash in the drive train when a rotational direction of the drive train changes. By determining the time to stop the resumed fuel supply in this way, error accompanying the nonlinear torque change can be reduced. As a result, the time at which the resumed fuel is to be stopped can be determined with improved precision and the longitudinal vibration of the vehicle can be suppressed.

The fuel supply stop circuit 1*b* is configured to stop the injection of fuel from the fuel injection valves 7 when the engine rotational speed is equal to or larger than a prescribed valve and the throttle opening degree TVO is fully closed, such as when the vehicle is coasting (e.g., a prescribed vehicle running state). The torque recovery control circuit 1*c* is configured to resume the fuel supply when the suspension of the fuel supply is canceled and to stop the fuel injection for a prescribed amount of time in accordance with a prescribed fuel injection pattern.

By stopping the supply of fuel to the cylinders 102*a*, 102*b*, 102*c*, . . . based on a time when the taking up of rotational play in the drive train ends during resumption of the fuel supply from a state in which the fuel supply is stopped, the torque recovery control circuit 1*c* controls the fuel injection to absorb the torque shock that occurs when the fuel supply is resumed in a short amount of time without incurring a loss of acceleration performance. Starting from the first cylinder that will undergo combustion immediately after it is determined that the fuel supply will be resumed, an engine torque is generated such that the torsional vibration occurring in the drive train of the vehicle when the fuel supply is resumed is effectively cancelled out. As will be described later, the torque recovery control circuit 1*c* computes a cylinder to which fuel will not be injected based on the vehicle speed VSP and the engine rotational speed Ne and stops the supply of fuel to the cylinders 102*a*, 102*b*, 102*c*, . . . according to a computed fuel injection pattern. The "time when rotational play in the drive train will finish being taken up" refers to a point in time when a nonlinear torque change occurring in the drive train (which transmits a drive force of the engine 102 to the wheels 106) due to gear backlash ends during the change from a non-drive state to a drive state (e.g., prescribed vehicle running state). The drive state is a vehicle running state in which the drive train is transmitting a drive force of the engine 102 to the wheels 106, and the non-drive state is a vehicle running state in which the wheels 106 are rotating due to the movement of the vehicle and the drive train is transmitting the rotation of the wheels to the engine 102.

In the first embodiment, the timing at which the fuel supply will be stopped is set based on information (e.g., engine rotational speed Ne and vehicle speed VSP) regarding when rotational play in the drive train will finish being taken up. As a result, a delay in the timing at which the fuel supply is stopped can be reduced such that the torsional vibration can be suppressed in an effective fashion and longitudinal vibration of the vehicle can be prevented. Additionally, situations in which the engine rotational speed Ne changes, e.g., during gradual acceleration and rapid acceleration, can be accommodated and the torque shock can be reduced.

Figure 3:
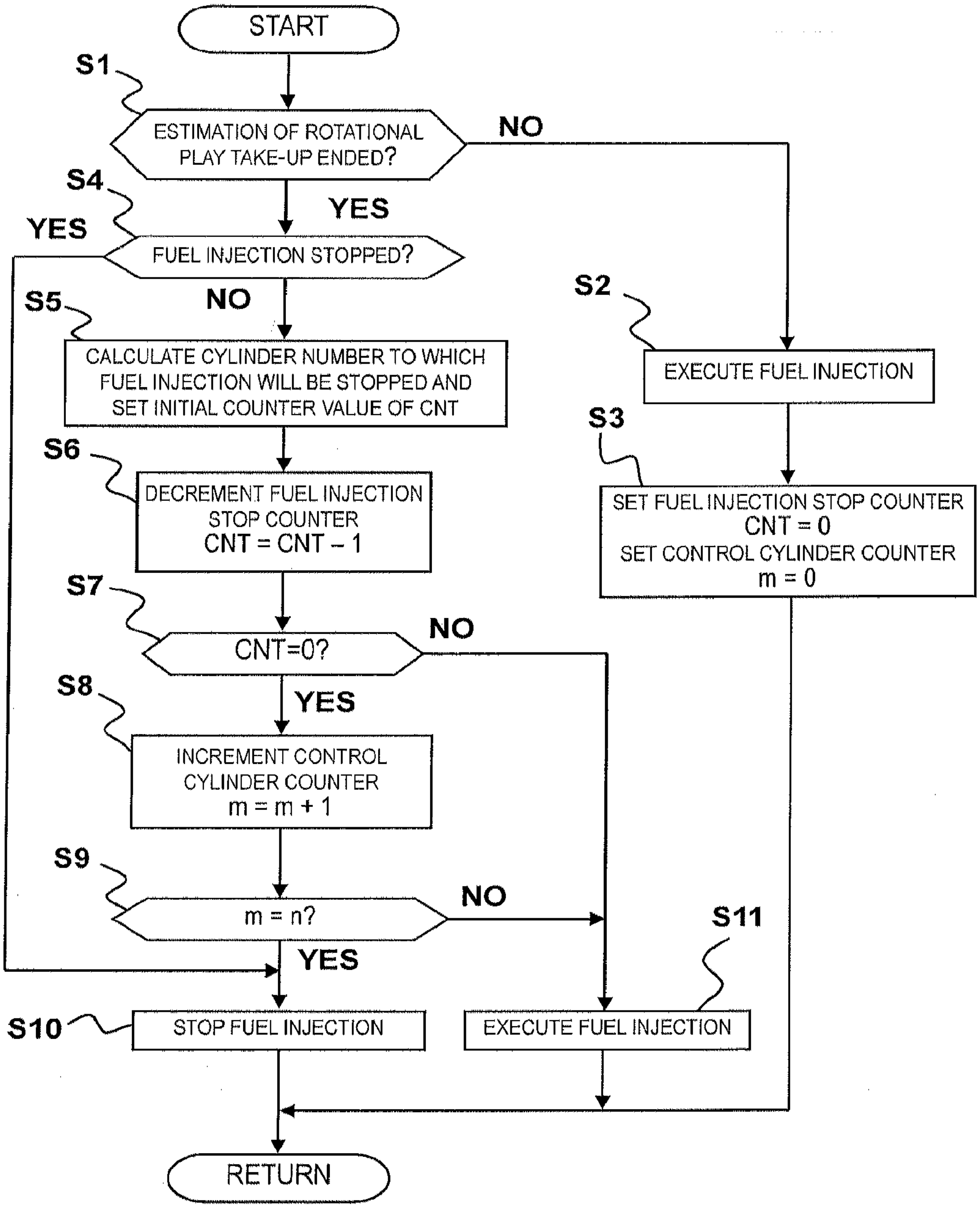
FIG. 3 is a flowchart illustrating the processing executed by a torque recovery control circuit to perform a fuel injection resumption control in accordance with the illustrated embodiment.

FIG. 3 is a flowchart showing the fuel injection resumption control processing executed by the torque recovery control circuit 1*c* of the first embodiment. This control processing serves to determine whether or not to stop the fuel supply based on a detection of an end of rotational play being taken up in the drive train.

In step S1, the torque recovery control circuit 1*c* determines if the taking up of rotational play in the drive train has ended (e.g., prescribed vehicle running state) since the fuel supply resumed from a stopped state, i.e., since an idle switch 6 turned off. If Yes, then the torque recovery control circuit 1*c* proceeds to step S4, and if No, then the torque recovery control circuit 1*c* proceeds to step S2.

For example, consider a situation in which the vehicle is coasting with the accelerator off and the engine 102 is not outputting a drive force. If the driver then performs an operation that causes the engine 102 to produce a drive force, then the output shaft, i.e., crankshaft, of the engine 102 will transmit a force and the torque of the drive shaft 105 will change from a negative state to a positive state. In other words, the drive shaft 105 will change from a non-drive state in which it is rotated by the wheels 106 to a drive state in which a drive force of the engine 102 is transmitted to the wheels 106. Consequently, the vehicle exhibits a phenomenon wherein the engine rotational speed increases at the moment when the rotational play in the drive train is being taken up and decreases when the rotational play has been completely taken up. The first embodiment utilizes this phenomenon to determine when the taking up of rotational play will end and uses the determined point in time as a trigger for starting the control.

Figure 4:
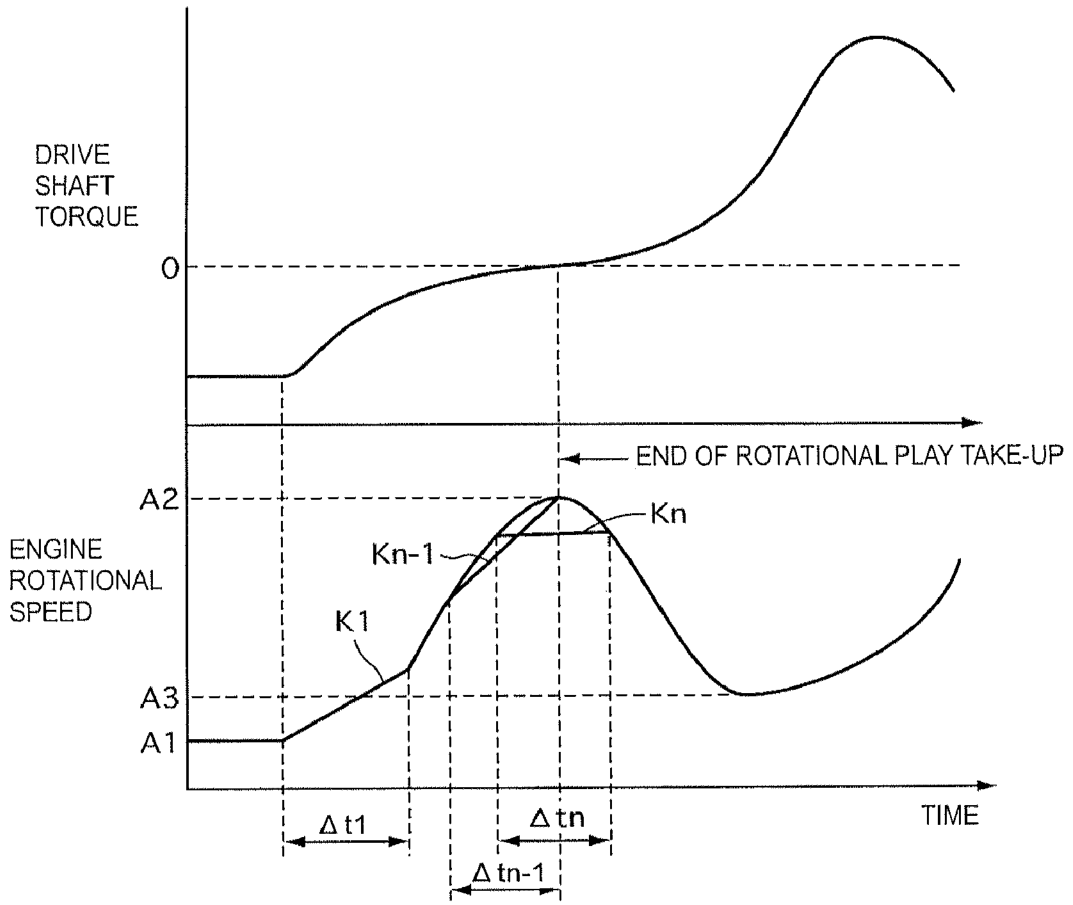
FIG. 4 is a time chart of a drive shaft torque and an engine rotational speed illustrating a method of determining when a taking up of rotational play has ended used in the illustrated embodiment.

For example, as shown in FIG. 4, when the vehicle changes from a coasting state in which the accelerator is "off" (e.g., a first prescribed vehicle running state) (assume engine rotational speed is at a value A1) to a fuel cut recovery state in which the accelerator is "on" (e.g., a second prescribed vehicle running state), the engine rotational speed increases to a value A2 as the rotational play is taken up and then decreases again to a value A3. At the point in time when the engine rotational speed reaches A2, the taking up of rotational play ends and the engine torque is transmitted to the drive shaft 105.

The computer processing constituting the method of detecting the end of taking up rotational play will now be explained.

First, the point in time when the idle switch changes from "off" to "on" (e.g., a second prescribed vehicle running state) is used as a computational reference for determining the end of rotational play take-up. Second, a differential change rate K1 of the engine rotational speed is calculated for a 10-ms period Δt1. Then, differential change rates K2 to Kn are calculated for each 5-ms period Δt2 to Δtn using a moving average method to smooth dispersion (scatter) in the engine rotational speed data. When the rotational play is taken up, i.e., when there is no more play, in the drive shaft 105, the change rate Kn of the current step will be equal to or smaller than the change rate Kn−1 of the previous step (Kn−1≧Kn). Thus, the point in time when the drive shaft torque changes from negative to positive is determined to be the end of the taking up of rotational play and is set as a fuel injection stop reference trigger.

Since the condition Kn−1≧Kn could possibly be satisfied right away due to noise, a threshold value determined, for example, is experimentally established in advance. If the difference between Kn−1 and Kn is smaller than the threshold value, then the change in the change rate is assumed to be small and within the range of error and the apparatus determines that the end of taking up rotational play has not been reached. As a result, incorrect determinations of the end of taking up rotational play resulting from noise can be prevented.

In step S2, the torque recovery control circuit 1*c* executes fuel injection and proceeds to step S3.

In step S3, the torque recovery control circuit 1*c* clears (zeros) a fuel injection stop counter CNT and a control cylinder counter m.

In step S4, the torque recovery control circuit 1*c* determines if the fuel injection is stopped based an intake air quantity detected by the intake air quantity sensor 4. If Yes, then the torque recovery control circuit 1*c* proceeds to step S10, and if No, then the torque recovery control circuit 1*c* proceeds to step S5.

In step S5, in order to accomplish a non-combustion stroke in which fuel is not injected, the engine rotational speed that will exists at that time and the current cycle stroke of each cylinder 102*a*, 102*b*, 102*c*, . . . are calculated using a computational formula. Meanwhile, a cylinder n with respect to which fuel injection will stopped and a half period T of the torsional vibration of the drive train are estimated based on a current traveling state using a prepared map obtained by experimentally investigating an optimum time for executing a non-combustion stroke in order to suppress torsional vibration in the drive train or using a calculation employing a unique torsion value of the drive shaft. The torque recovery control circuit 1*c* then determines which cylinder n will first match the non-combustion timing in terms of the number cylinders after the current cylinder. The torque recovery control circuit 1*c* then proceeds to step S6.

The half period T of the torsional vibration of the drive train is calculated using the equation shown below.

$$T=(C1\times C2\times Ne)/(2\times VSP)$$

In the equation, the term C1 is a constant determined based on a spring constant of the drive shaft and an inertia ip of the engine, and the term C2 is a constant determined based on a dynamic radius of a tire.

Based on the calculated half period T and the control cycle period, the torque recovery control circuit 1*c* sets an initial counter value of the fuel injection stop counter CNT. The fuel injection stop counter CNT is set such that it reaches zero immediately before a time when the torsional vibration of the drive train reaches a first peak P.

The cylinder n for which the fuel injection will be stopped can be calculated using the equation below.

$$n=[T/\Delta T]$$

The square parentheses [ ] are a Gaussian symbol, and ΔT is a combustion interval determined based on the engine rotational speed Ne and can be expressed as ΔT=C3/Ne, where the term C3 is a constant.

Therefore, the cylinder n for which the fuel injection will be stopped can be expressed as shown below, where the term C is a prescribed constant.

$$n[(C\times Ne^2)/VSP]$$

In step S6, the torque recovery control circuit 1*c* decrements the fuel injection stop counter CNT set in step S5 and proceeds to step S7.

In step S7, the torque recovery control circuit 1*c* determines if the value of the fuel injection stop counter CNT is zero. If Yes, then the torque recovery control circuit 1*c* proceeds to step S8, and if No, then the torque recovery control circuit 1*c* proceeds to step S11.

In step S8, the torque recovery control circuit 1*c* increments a control cylinder counter and proceeds to step S9. The control cylinder counter serves to count each cylinder controlled.

In step S9, the torque recovery control circuit 1*c* determines if the current cylinder m being controlled is the cylinder n determined in step 5 for which fuel injection will not be executed. If Yes, then the torque recovery control circuit 1*c* proceeds to step S10, and if No, then the torque recovery control circuit 1*c* proceeds to step S11.

In step S10, the torque recovery control circuit 1*c* generates an injection prohibiting signal. As a result, the next combustion stroke of that cylinder is modified such that combustion does not occur.

In step S11, the torque recovery control circuit 1*c* executes fuel injection and returns.

When the accelerator is turned "on" from an "off" state in which the vehicle is coasting, the transitional output of the engine 102 undergoes a step-like torque fluctuation. Consequently, a torsional vibration occurs in the power train/drive train and the vehicle undergoes a longitudinal shaking. This phenomenon is called "accelerator ON shock." Japanese Laid-Open Patent Publication No. 8-28322 discloses a technology for suppressing this phenomenon. In the disclosed technology, a grid-like pattern map containing a large number of patterns related to the engine rotational speed and the vehicle speed is stored in an engine controller and longitudinal vibration of the vehicle is reduced in an effective manner when the fuel injection changes from a stopped state to an operating state (i.e., when a fuel cut recovery is executed).

With a technology that uses the turning off of an idle switch as a reference trigger and a prepared pattern map to determine the cylinder to which the fuel injection will be stopped and the timing at which the fuel injection will be stopped, a larger error can occur because the timing at which the fuel injection will be stopped is not varied according to changes in the cycle time of the engine 102, which changes in accordance with the engine rotational speed. Consequently, the fuel injection stop control is not executed at an optimum time for suppressing the torsional vibration and it is difficult to reduce the peak of the torque in the drive train in an effective manner.

Meanwhile, Japanese Laid-Open Patent Publication No. 10-252514 discloses a technology in which the resumption of the fuel supply is used as a trigger and the fuel supply is stopped with respect to a cylinder that is expected to undergo combustion immediately before the torsional vibration of the drive train reaches a first peak. However, the reference trigger for determining a change from a state in which the fuel injection is stopped to a state in which fuel injection is executed is based on the idle switch turning off. In other words, when a fuel supply resumption control method (TMFR: a method in which a timer is operated and the fuel injection is resumed) is executed, the nonlinear torque change that occurs when the vehicle changes from a non-drive state to a drive state is not taken into account in the fuel supply resumption control signal. Consequently, during the control, the setting of the fuel injection stop incurs a large amount of dispersion (potential error) due to a delay related to the fuel cycle and a delay related to the fuel cut timing resulting from the nonlinear torque change.

In contrast to the conventional technology, the fuel injection control apparatus for the engine 102 in accordance with the first embodiment uses an “end of rotational play take-up in the drive train” as a reference start trigger for starting an engine torque suppression control for suppressing a longitudinal vibration of a vehicle that occurs when an accelerator of the vehicle is turned “on” (depressed) while the vehicle is coasting in a lockup state (fuel cut state).

More specifically, after the fuel supply has been resumed, the steps S1, S2 and S3 of the flowchart shown in FIG. 3 are repeated and fuel injection is executed until the taking up of rotational play in the drive train has ended.

When the taking up of rotational play in the drive train has ended, the steps S1, S4, S5, S6, S7, S8, S9, and S11 are repeated until the value of the fuel injection stop counter CNT goes to zero or the value of the control cylinder counter m becomes equal to the non-injection cylinder n. When the value of the fuel injection stop counter CNT has reached zero or the value of the control cylinder counter m is equal to the non-fuel injection cylinder n, the steps S1, S4, S5, S6, S7, S8, S9, and S10 are executed such that the fuel injection is stopped with respect to the non-injection cylinder n.

Figure 5:
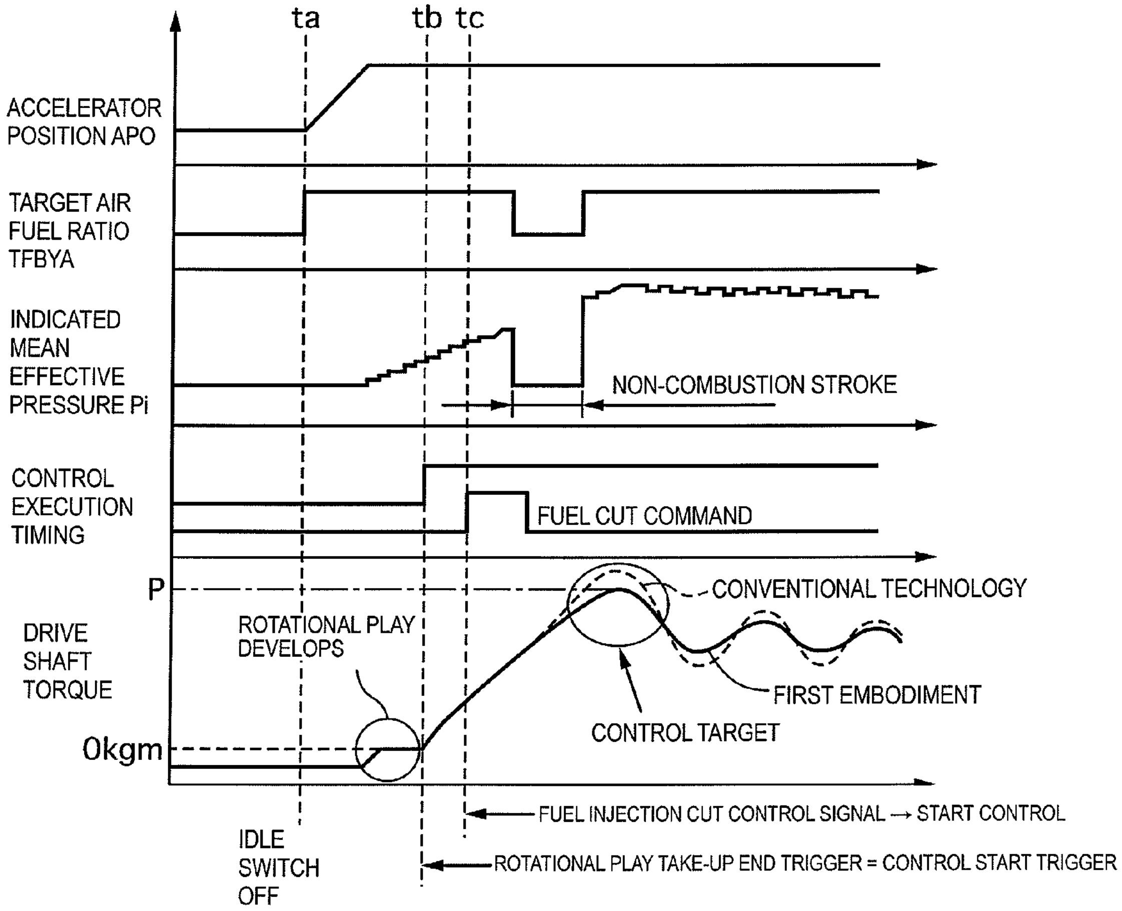
FIG. 5 is a time chart that illustrates an effect of the illustrated embodiment with respect to reducing the torsional vibration in the drive train, where the time chart plots the accelerator position, the target air fuel ratio, the indicated mean effective pressure (IMEP) of the engine, the control execution timing, and the drive shaft torque.

FIG. 5 is a time chart that illustrates the effect of the first embodiment with respect to reducing the torsional vibration in the drive train. The time chart plots the accelerator position, the target air fuel ratio, the indicated mean effective pressure (IMEP) of the engine 102, the control execution timing, and the drive shaft torque.

With a conventional control, the control reference signal is set to a point in time ta occurring when the idle switch turns “off”, i.e., before the drive shaft torque actually rises. Consequently, the vibration suppressing performance of the control is greatly affected by error and a delay related to the fuel cycle resulting from a nonlinear torque change (taking up of rotational play) occurring when the vehicle changes from a non-drive state to a drive state. Thus, the dispersion of the fuel cut timing is large and it is difficult to time the non-combustion stroke to occur immediately before the first peak P of the torsional vibration in the drive train is reached, which would be the most effective way to reduce the torsional vibration. As a result, the drive shaft torque fluctuates greatly as indicated with the broken line in FIG. 5 and the longitudinal vibration of the vehicle cannot be effectively suppressed.

In contrast, in the first embodiment, the point in time tb when the torque of the drive train reverses direction, i.e., when the taking up of rotational play ends, is used as the reference trigger. The cylinder n with respect to which non-injection control will be executed and the timing of the non-injection control (i.e., the initial value of the fuel injection stop counter CNT) are calculated based on the vehicle speed VSP and the engine rotational speed Ne at the time when the taking up of rotational play ends, and a fuel cut command is issued at a time tc. As a result, the delay in the fuel cycle delay resulting from the passage of the rotational play and the dispersion can be eliminated completely and the non-combustion stroke can be executed at an optimum timing. Thus, the first peak P of the torsional vibration targeted by the control can be decreased in an effective manner. Furthermore, the effect of backlash (an increase in the second and subsequent peaks) can be held in check.

In the first embodiment, the amount of time from the point in time when the taking up of rotational play ends to the end of a half period T of the torsional vibration of the drive train is computed and the fuel injection to the cylinder expected to undergo combustion immediately before the computed amount of time has elapsed is stopped. The amount of time from the point in time when the taking up of rotational play ends to point in time when the torsional vibration of the drive train reaches a first peak P is equal to amount of time from the point in time when the taking up of rotational play ends to the end of a half period T of the torsional vibration of the drive train. Thus, by stopping the supply of fuel to the cylinder expected to undergo combustion immediately before the half period of the torsional vibration is reached, it is not necessary to set a map containing large quantities of data for each pattern and the manufacturing cost and development work can be reduced.

Additionally, with the first embodiment, since the half period T of the torsional vibration is estimated based on the vehicle speed VSP and the engine rotational speed Ne at the point in time when the taking up of rotational play ends, an optimum combustion timing can be determined which accommodates such operating condition changes as successive changes in the engine rotational speed, changes in the gear ratio of the transmission, and differences in the speed at which the accelerator is depressed.

The effects obtained with the first embodiment will now be presented in list form.

(1) The fuel injection control apparatus has a torque recovery control circuit 1*c* configured to stop the fuel supply to at least one of the cylinders 102*a*, 102*b*, 102*c*, . . . based on an estimated timing so as to reduce a first peak P of a torsional vibration occurring in the drive train after the fuel supply is resumed. As a result, error in the non-fuel injection control can be reduced and the fuel supply can be stopped at an appropriate timing, enabling the longitudinal vibration of the vehicle to be suppressed. In addition to the increased precision, the manufacturing cost and development work can be reduced.

(2) The torque recovery control device 1*c* is configured to estimate a cylinder expected to undergo combustion immediately before a time at which a first peak of a torsional vibration occurs in the drive train after a resumption of a fuel supply, and to stop a fuel supply to said estimated cylinder. As a result, the conventional process of experimentation required to prepare a pattern map containing a large quantity of data can be omitted, thereby reducing the time and cost required for development. Furthermore, the memory capacity of the engine controller can be reduced, thus reducing the direct manufacturing cost, while reliably ensuring good drivability.

(3) The torque recovery control device 1*c* is configured to estimate an amount of time from a timing at which the vehicle changes from a non-drive state to a drive state until a torsional vibration occurring in the drive train reaches a half period T and to stop fuel injection to a cylinder expected to undergo combustion immediately before the amount of time is reached. As a result, a non-injection timing and a non-injection cylinder that are appropriate for the vibrational characteristics can be varied from situation to situation such that the timing at which the fuel injection is stopped can be set accurately and the torsional vibration can be suppressed effectively under various conditions, such as gradual acceleration and rapid acceleration. Additionally, since an appropriate engine control torque down can be executed even when the fuel supply is resumed and the vibration is suppressed, worsening of a backlash of the vehicle vibration caused by the error can be eliminated.

(4) The torque recovery control circuit 1*c* estimates the amount of time until the torsional vibration of the drive train reaches its half period T based on the vehicle speed VSP and the engine rotational speed Ne at the time when the vehicle changes from a non-drive state to a drive state. As a result, the peak of the torsional vibration of the drive train (which changes depending on the engine rotational speed Ne) can be predicted accurately and an appropriate control can be executed.

(5) The timing at which the vehicle changes from a non-drive state to a drive state is estimated based on a change rate of the engine rotational speed Ne, the timing can be estimated simply and accurately and the timing at which the fuel injection will be stopped can be set with a consistently high degree of accuracy.

Second Embodiment

In the second embodiment, an engine initial explosion signal is used as a start time of a timer and the timing at which the vehicle changes from a non-drive state to a drive state is estimated by setting the timer. Therefore, in the second embodiment, the only part of the fuel injection resumption control executed by the torque recovery control circuit 1*c* shown in FIG. 3 that is different from the first embodiment is the estimation of the end of taking up rotational play executed in step S1.

In the second embodiment, a timer setting time map is prepared in advance and the timer is started at a time when the engine initial explosion signal is issued. In step S1, it is determined that the taking up of rotational play has ended when the preset amount of time has elapsed.

A fuel injection control apparatus for the engine 102 in accordance with the second embodiment achieves the following effect in addition to the effects (1) to (4) achieved with the first embodiment. The time at which the vehicle changes from a non-drive state to a drive state is estimated based on an amount of time elapsed since the initial explosion of the engine resulting from the resumption of the fuel supply. As a result, the time of the change can be determined simply and accurately based on only the initial explosion signal of the engine 102 and the timing at which the fuel injection will be stopped can be set with a consistently high degree of accuracy.

Third Embodiment

In the third embodiment, the time at which the vehicle changes from a non-drive state to a drive state is estimated based on a difference between the engine rotational speed and the drive shaft rotational speed. Therefore, in the third embodiment, the only part of the fuel injection resumption control executed by the torque recovery control circuit 1*c* shown in FIG. 3 that is different from the first embodiment is the estimation of the end of taking up rotational play executed in step S1.

In step S1, the torque recovery control circuit 1*c* calculates the rotational speed Nefd transmitted to the drive shaft 105 by dividing the engine rotational speed by the final drive gear ratio and determining the difference between the calculated drive shaft rotational speed Nefd and the actual rotational speed of the drive shaft. If there is not difference, then the torque recovery control circuit 1*c* determines that the taking up of rotational play has ended.

An appropriate value to be used in the calculation is selected using a prepared map of information related to the rate of change of the accelerator position and the gear ratio. When the rotational play has been taken up, there is no play in the gears and torque is transmitted from the engine to the drive shaft 105. Consequently, there is no difference between the drive shaft rotational speed calculated based on the engine rotational speed and the actual rotational speed of the drive shaft.

A fuel injection control apparatus for an engine 102 in accordance with the third embodiment achieves the following effect in addition to the effects (1) to (4) achieved with the first embodiment. Since the time at which the vehicle changes from a non-drive state to a drive state is estimated based on a difference between the rotational speed of the engine and the rotational speed of the drive shaft 105, the time of the change can be determined simply and accurately and the timing at which the fuel injection will be stopped can be set with a consistently high degree of accuracy

Other Embodiments

Although in the first embodiment, the fuel injection is stopped only for the cylinder that would undergo combustion immediately before a first peak of the torsional vibration of the drive train, it is also possible to include at least one cylinder that will undergo combustion immediately before a peak and it is acceptable for the fuel injection to a plurality of cylinders to be stopped so long as the number of cylinders is within a range that will not affect the acceleration performance. Although in the above mentioned embodiments, the fuel injection is stopped only for the cylinder that would undergo combustion immediately before a first peak of the torsional vibration of the drive train, it is also acceptable to stop the fuel supply to a cylinder that would undergo combustion before a second or later peak. Also, the method of estimating the timing at which the vehicle changes from a non-drive state to a drive state (i.e., at which the taking up of rotational play ends) can be a combination of the methods described in the embodiments.

General Interpretation of Terms

In understanding the scope of the present invention, the term “comprising” and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,”

"member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel injection control apparatus comprising:

a supply control section configured to control a supply amount of a fuel supplied to an internal combustion engine based on a detected prescribed vehicle running state;

a stop control section configured to stop supplying the fuel upon detecting that a first prescribed vehicle running state exists that is indicative of a vehicle coasting;

a timing estimating section configured to use a fluctuation rate of an engine rotational speed of the engine to estimate a timing signifying an end to rotational play takeup in a drive train transmitting a drive force from the engine to a wheel when a state of the drive train changes from a non-drive state in which the engine rotates due to a force from the wheel to a drive state in which the wheel rotates due to the drive force of the engine; and a torque recovery control section configured to resume supplying the fuel upon detecting that a second prescribed vehicle running state exists that is indicative of vehicle acceleration, and configured to use the timing signifying the end to rotational play takeup as a reference trigger to stop resumption of fuel being supplied for a prescribed amount of time, the timing estimated by the timing estimating section corresponding to a peak engine rotational speed of the engine resulting from the engine rotational speed increasing and then the engine rotational speed immediately decreasing.

2. The engine fuel injection control apparatus as recited in claim 1, wherein the torque recovery control section is further configured to stop supplying the fuel to a cylinder among a plurality of cylinders that is predicted to undergo combustion immediately before a torsional vibration occurring in the drive train reaches a first peak after supplying the fuel to the engine.

3. The engine fuel injection control apparatus as recited in claim 1, wherein the torque recovery control section is further configured to stop supplying the fuel to a cylinder among a plurality of cylinders that is predicted to undergo combustion immediately before an estimated amount of time is reached until a torsional vibration occurring in the drive train undergoes one half of a cycle based on the peak engine rotational speed.

4. The engine fuel injection control apparatus as recited in claim 3, wherein the torque recovery control section is further configured to estimate the amount of time until the torsional vibration occurring in the drive train undergoes the one half of the cycle based on a vehicle speed and the peak engine rotational speed.

5. A fuel injection control apparatus comprising:

supply control means for controlling a supply amount of a fuel supplied to an internal combustion engine based on a detected prescribed vehicle running state;

stop control means for stopping supplying the fuel upon detecting that a first prescribed vehicle running state exists that is indicative of a vehicle coasting;

timing estimating means for estimating a timing signifying an end to rotational play takeup in a drive train transmitting a drive force from the engine to a wheel when a state of the drive train changes from a non-drive state in which the engine rotates due to a force from the wheel to a drive state in which the wheel rotates due to a drive force of the engine based on a fluctuation rate of an engine rotational speed of the engine; and torque recovery control means for resuming the supply of the fuel when the vehicle is in a second prescribed vehicle running state that is indicative of vehicle acceleration, and for stopping resumption of fuel being supplied for a prescribed amount of time using the timing signifying the end to rotational play takeup as a reference trigger for the stopping of the resumption of the fuel, the timing estimated by the timing estimating section corresponding to a peak engine rotational speed of the engine resulting from the engine rotational speed increasing and then the engine rotational speed immediately decreasing.

6. A fuel injection control method comprising:

detecting a vehicle running state;

controlling an amount of fuel supplied to an internal combustion engine based on the vehicle running state that was detected;

stopping supply of the fuel upon detecting that a first prescribed vehicle running state exists that is indicative of a vehicle coasting;

resuming the supply of the fuel upon detecting that a second prescribed vehicle running state exists that is indicative of vehicle acceleration;

estimating a timing signifying an end to rotational play takeup in a drive train configured to transmit a drive force of the engine to a wheel when a state of the drive train changes from a non-drive state in which the engine rotates due to a force from the wheel to a drive state in which the wheel rotates due to a drive force of the engine based on a fluctuation rate of an engine rotational speed of the engine; and stopping resumption of the supply of the fuel for a prescribed amount of time using the timing signifying the end to rotational play takeup as a reference trigger for the stopping of the resumption of the supply of the fuel, the estimated timing corresponding to a peak engine rotational speed of the engine resulting from the engine rotational speed increasing and then the engine rotational speed immediately decreasing.

7. The engine fuel injection control apparatus as recited in claim 2, wherein the torque recovery control section is further configured to stop supplying the fuel to a cylinder among a plurality of cylinders that is predicted to undergo combustion immediately before an estimated amount of time is reached until a torsional vibration occurring in the drive train undergoes one half of a cycle based on the peak engine rotational speed.

8. The engine fuel injection control apparatus as recited in claim 7, wherein the torque recovery control section is further configured to estimate the amount of time until the torsional vibration occurring in the drive train undergoes the one half of the cycle based on a vehicle speed and the peak engine rotational speed.

* * * * *